United States Patent Office 3,287,210
Patented Nov. 22, 1966

3,287,210
ANTIMONY COMPOUNDS AND COMPOSITIONS AND METHOD FOR PROTECTING AGAINST MICROORGANISMS
John R. Leebrick, Roselle Park, N.J., assignor to M & T Chemicals Inc., New York, N.Y., a corporation of Delaware
No Drawing. Filed Dec. 26, 1962, Ser. No. 247,378
25 Claims. (Cl. 167—30)

This invention relates to methods of preventing and inhibiting the growth of microorganisms such as bacteria and fungi and to compositions of matter which may be utilized in these methods. The invention also relates to materials which may be rendered resistant to attack by microorganisms such as bacteria by the aforesaid methods.

It is an object of this invention to provide methods for inhibiting and preventing the growth of microorganisms including bacteria and fungi. It is another object of this invention to provide bacteria-resistant compositions including paints, plastics, and fibrous products such as textiles and paper products. It is a further object of this invention to provide sanitizer compositions having particular utility in hospital treatment. Other objects will be apparent to those skilled in the art on inspection of the following description.

In accordance with certain of its aspects, the method of this invention for protecting a medium susceptible to attack by microorganisms comprises applying to the locus to be protected an effective amount of a compound $R_mSbX_{5-m}$, wherein R is selected from the group consisting of alkyl, alkenyl, aryl, cycloalkyl, and cycloalkenyl, X is selected from the group consisting of chloride, acrylate, pentachlorophenate, and quinolinolate, and $m$ is an integer less than 5.

In the compound $R_mSbX_{5-m}$, which may be used in practice of this invention, R may be alkyl, cycloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, 2-propenyl (i.e. allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl, as well as inertly substituted cycloalkyl groups including 2-methyl cycloheptyl, 3-butyl cyclohexyl, 3-methyl cyclohexyl, etc. Typical alkynyl groups which may be employed include propyn-1-yl, propyn-2-yl, butyn-1-yl, phenylethynyl, ethynyl, etc. Typical aryl groups which may be employed may include phenyl, tolyl, xylyl, chlorophenyl, dimethyl aminophenyl, etc. When several R groups may be present, they may be the same or different.

In the compound $R_mSbX_{5-m}$, $m$ may be an integer less than 5, i.e. $m$ may be 1, 2, 3, and 4. When $m$ is 1, the compound may be $RSbX_4$; when $m$ is 2, the compound may be $R_2SbX_3$, when $m$ is 3, the compound may be $R_3SbX_2$; when $m$ is 4, the compound may be $R_4SbX$. The preferred compounds may be those wherein $m$ may be 3, i.e. $R_3SbX_2$.

The X group in the compound $R_mSbX_{5-m}$ may be selected from the group consisting of chloride, acrylate, pentachlorophenate, and quinolinolate. Where several X groups may be present, they may not necessarily be identical. These compounds may be readily available commercially as in the case of the chloride and the pentachlorophenate or, in the case of the quinolinolate and acrylate, synthesized as herein described. When X is chloride, the typical compound, triphenyl antimony dichloride may be conveniently made by e.g. chlorination of triphenyl antimony. When X is pentachlorophenate, the desired derivative may be obtained for example by reaction of two equivalents of pentachlorophenol with e.g. triphenyl antimony oxide.

Typical specific compounds which may be employed when $m$ is 1 may include phenyl antimony tetrachloride, n-butyl antimony tetra-pentachlorophenate, phenyl antimony tetraquinolinolate, 2-chlorophenyl antimony tetrachloride, 2-chloro, 5-nitrophenyl antimony tetrachloride, etc.

Typical specific compounds which may be employed when $m$ is 2 may include dimethyl antimony trichloride, diphenyl antimony trichloride, di-n-butyl antimony triacrylate, diphenyl antimony tripentachlorophenate, diphenyl antimony triquinolinolate, etc.

Typical specific compounds which may be employed when $m$ is 3, the preferred group of compounds, may include trimethyl antimony dichloride, tri-n-butyl antimony dichloride, tri-n-propyl antimony bis-pentachlorophenate, triphenyl antimony bis-acrylate, triphenyl antimony dichloride, triphenyl antimony bis-pentachlorophenate, triphenyl antimony bis-quinolinolate, etc.

Typical specific compounds which may be employed when $m$ is 4 may include tetra-n-butyl antimony chloride, tetraphenyl antimony acrylate, etc.

It is a feature of compounds wherein $m$ is 3 or 4 that they may be much more stable, particularly in the presence of water or alkali, than those compounds wherein $m$ is 1 or 2. For purpose of convenience, reference may hereafter be made to the preferred compounds wherein $m$ is 3.

The novel compounds of this invention may include compounds $R_mSbD_{5-m}$ wherein D may be quinolinolate and acrylate. Typical of these novel compounds may be noted methyl antimony tetraquinolinolate, n-butyl antimony tetraacrylate, phenyl antimony tetraquinolinolate, di-n-butyl antimony triacrylate, diphenyl antimony tri-quinolinolate, triphenyl antimony bis-acrylate, triphenyl antimony bis-quinolinolate, tri-n-propyl antimony bis-quinolinolate, tri-n-butyl antimony bis-acrylate, tetraphenyl antimony acrylate, tetraphenyl antimony quinolinolate.

It is a feature of the novel quinolinolate and acrylate compounds of this invention, $R_mSbD_{5-m}$, that they may be prepared by the following illustrative reaction:

$$R_mSbA_{5-m} + (5-m)MD \rightarrow R_mSbD_{5-m} + (5-m)MA$$

or typically

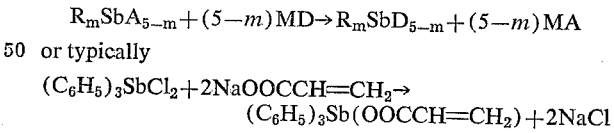

In practice of this invention, the compound $R_mSbA_{5-m}$, wherein A may be selected from the group consisting of oxide, hydroxide, and halogen, preferably chloride, may be mixed in substantially stoichiometric quantities with the compound MD wherein D may be the acrylate radical derived from acrylic acid or the quinolinolate radical derived from 8-hydroxy quinoline, and M is selected from the group consisting of hydrogen and metals preferably alkali metals such as ammonium, potassium, and sodium. When A is the divalent oxide, it will be apparent that the oxygen may be considered to be equivalent to two A groups and the compound $R_mSbA_{6-m}$ may be e.g. $R_3SbO$. When A is oxide or hydroxide, M will be hydrogen; when A is halogen, M will be a metal, preferably an alkali metal including sodium.

In carrying out the reaction, the compounds may be mixed in an inert solvent or diluent typically methanol, dioxane, tetrahydrofuran, etc. in which the compounds reacted or the products of reaction may be soluble or insoluble. The reaction mixture may be heated with agitation for e.g. 30–60 minutes, typically 45 minutes to e.g. 60° C.–150° C., say 80° C., and preferably to below the boiling point of the solvent or diluent. When the product may be insoluble in the diluent, the former may be recovered from the reaction mixture by filtration. The filter cake may be washed with the inert solvent to remove any soluble unreacted materials and then with e.g. water to remove water-soluble by-products including e.g. sodium chloride. If the product be one which may have a poor hydrolytic stability, it may be recovered by washing the filter cake with a solvent in which it may be soluble e.g. toluene, acetone, etc. followed by recrystallization from the solvent. When the product may be soluble in the diluent as is the case e.g. with triphenyl antimony bis-acrylate in methanol, the reaction mixture may be filtered at the conclusion of the reaction to remove by-product MA if present and then heated (preferably under reduced pressure) to remove solvent from the residue-product.

In practice of a typical illustrative reaction, 40 parts of triphenyl antimony oxide may be mixed with 14.8 parts of acrylic acid. The mixture may be heated to about 130° C. for 15 minutes during which time by-product water may be volatilized. The crude product, triphenyl antimony bis-acrylate, which may crystallize on cooling, may be dissolved in an excess of methanol and the solution cooled to above 0° C. to precipitate the product. After filtration and air-drying, 33.5 parts (60% yield) of recovered product (M.P. ca. 90° C.) may be obtained.

In practice of another typical illustrative reaction, 18.45 parts of triphenyl antimony oxide may be mixed with 14.5 parts of 8-hydroxy quinoline and 120 parts of toluene. The mixture may be heated to reflux at about 110° C. for 180 minutes during which time, the theoretical amount of water (0.9 part) may be collected. The crude product, a greenish-yellow liquid may be cooled to 0° C. with stirring over 30 minutes. The precipitate, 20 parts (60% yield) of a yellow crystalline solid product (M.P. 197° C.–199° C.), may be recovered by filtration. This product may unexpectedly be found to exhibit a broad spectrum of biocidal activity including activity against fungi and bacteria.

It is a particular feature of this invention that antimony compounds $R_mSbX_{5-m}$ may be used to control a wide range of microorganisms including bacteria. These compounds may be highly effective against gram positive bacteria including *S. aureus*; and they unexpectedly possess simultaneous ability to control fungi.

In practice of this invention, these microorganisms may be controlled in a wide variety of loci. It is possible according to this invention to treat various agricultural targets, including potatoes, sugar beets, bananas, etc. as well as various plastics, textiles, paper products, paints, or other specific materials which may serve as media in which microorganisms may grow. Plastics, textiles, paper products, and paints are illustrative of the materials which are rendered resistant to attack when treated by applying the antimony compound to the surface and/or by incorporation therein. The plastics in massive and in fiber form may include urethanes, halogenated polymers and copolymers such as polyvinyl chloride and polyvinyl chloride-acetate copolymers, polyesters, polyamides, polyolefins, and natural or synthetic rubbers, etc. Natural fiber products that may be protected include paper products, hemp, and felts. Paints may be protected in storage and also after application. Typical paints may include interior and exterior vinyl latex and alkyd paints, non-synthetic flat natural paints, acrylic paints, vinyl paints, and anti-fouling paints such as those containing acrylic and vinyl compounds. The process of this invention may be used in preserving adhesives; in secondary oil recovery processes; in paper mill slime control processes; and in control of *S. aureus* e.g. in hospitals. The noted compounds may be active components of detergent sanitizers and may be used for this and other purposes in the form of an aerosol material. They may also be used to protect plants and other growth against microorganism attack.

Practice of certain aspects of this invention may be illustrated by reference to the following wherein various compounds were tested against a wide range of microorganisms. In Table I there is disclosed the results of the standard broth dilution test wherein various compounds as noted were tested against bacteria.

In the tables showing broth dilution test results, the tests are reported showing the activity of the compounds against noted microorganisms. In each example, a series of tests was carried out wherein the compound was placed within a nutrient broth in amount of 500, 250, 125, 63, 31, 16, 8, 4, and 2 parts per million (p.p.m.). Each broth was inoculated with the test organism and the test organism and the broth incubated at 37° C. for two days. The organism growth was visually observed. The broth containing the minimum concentration which caused complete inhibition of the growth of the organism is listed.

TABLE I

| Compound: | S. aureus |
|---|---|
| Triphenyl antimony bis-pentachlorophenate | 2 |
| Triphenyl antimony bis-quinolinolate | 2 |
| Triphenyl antimony dichloride | 63 |
| Triphenyl antimony diacrylate | 63 |

From Table I, it will be apparent that the noted compounds may be employed at unexpectedly low levels to kill bacteria including gram positive bacteria.

In Table II, there are listed the results of a standard broth dilution test against certain fungi.

TABLE II

| Compound | C. albicans | A. flavus | P. funiculosum |
|---|---|---|---|
| Triphenyl antimony bis-pentachlorophenate | 250 | 125 | 250 |
| Triphenyl antimony bis-quinolinolate | 31 | 63 | 31 |

From Table II, it will be apparent that the compounds of this invention exhibit unexpected activity against fungi.

The method of this invention may be effected by using the noted compound $R_mSbX_{5-m}$ in solid, liquid, or gaseous (including spray formulations) which preferably may include a carrier or diluent. It may for example be carried out by applying the compound to the surface of the material to be protected and/or admixing the compound with the material to be protected during fabrication of said material. The compounds may be used per se, particularly when they are incorporated into the material during preparation or fabrication. Many materials, particularly fibrous products such as textiles, may be treated by applying the compound to the surface by dipping, padding, spraying, etc. They may be used in the form of a bactericidal composition in which the compound is the active component or one of the active components. Liquid compositions may be utilized in which the compound is dissolved and/or suspended in a solvent. Solid compositions may be utilized in which the compound is mixed with a carrier or diluent. The carrier may be inert, such as talc, clay, diatomaceous earth, flour, etc., or it may have activity such as that shown by the quaternary ammonium compounds. The liquid formulations of the emulsion type may often include a dispersing agent such as an anionic, cationic, or nonionic surface active agent. To obtain a bactericidal composition having an extremely broad spectrum of activity, the compounds may be formulated with other active materials such as the triorganotins, pentachlorophenol, copper-8-quinolinolate, bisphenols, o-phenylphenol, and polybrominated salicylanilides.

It will be apparent to those skilled in the art that the amount of the active compound $R_mSbX_{5-m}$ present in the total composition may be sufficient to provide an effective amount at the locus to be protected against the appropriate microorganism. Typically such contained amounts may range from very low concentrations, typically 0.001% or 0.002%, up to 90%–100%. When the carrier is a solid e.g. talc, the compound may be present in amount of 5%–50%, say 20% of the total; when the carrier is a liquid e.g. isopropanol-Freon (under pressure), the compound may be present in amount of 0.01%–1%, say 0.05%. These concentrations may permit attainment on or in the medium susceptible to attack at the locus to be protected, of effective amount. Such amounts may be, e.g. in water treatment, 1–100 p.p.m. or in plastic treatment 10–2000 p.p.m., etc. Useful compositions containing the active compound may be those of Examples 1–4.

*Example 1.—Spray composition*

| | Parts by weight |
|---|---|
| Tributyltin oxide | 0.02 |
| Triphenyl antimony bis-quinolinolate | 0.02 |
| Toluene | 15.00 |
| Fluorohydrocarbon gaseous propellant | 84.96 |

*Example 2.—Liquid composition*

| | |
|---|---|
| Triphenyl antimony bis-pentachlorophenate | 1 |
| Acetone | 20 |
| Toluene | 79 |

*Example 3.—Emulsion composition*

| | |
|---|---|
| Triphenyl antimony dichloride | 0.02 |
| Toluene | 15 |
| Non-ionic surfactants (Triton X–100, an adduct of nonylphenol and ethylene oxide) | 20 |
| Water | 64.98 |

*Example 4.—Solid composition*

| | |
|---|---|
| Diatomaceous earth | 80 |
| Triphenyl antimony bis-quinolinolate | 20 |

Specific formulations which may be used in practice of this invention may include those set forth in Example 5–7.

*Example 5.—Acrylic anti-fouling paint*

| | Parts by weight |
|---|---|
| Titanium dioxide | 160 |
| Aluminum silicate | 48 |
| Talc | 12 |
| Methyl methacrylate-butyl methacrylate copolymer (40% in thinner) | 433 |
| Mineral spirits | 148 |
| Tributyl antimony dichloride | 50 |

*Example 6.—Vinyl anti-fouling paint*

| | |
|---|---|
| Titanium dioxide | 150 |
| Bentonite | 14 |
| Tricresyl phosphite | 10 |
| Vinyl chloride-vinyl acetate copolymer resin | 102 |
| Toluene | 223 |
| Methyl isobutyl ketone | 295 |
| Triphenyl antimony dichloride | 70 |

*Example 7.—Flat interior paint*

| | |
|---|---|
| Titanium-calcium pigment | 625 |
| Calcium carbonate | 100 |
| Magnesium silicate | 25 |
| Ester gum solution (60% non-volatile in mineral spirits) | 30 |
| Bodied linseed oil | 200 |
| Mineral spirits | 167 |
| Cobalt naphthenate (6% Co) | 1 |
| Lead naphthenate (24% Pb) | 2 |
| Triphenyl antimony bis-quinolinolate | 6 |

Those skilled in the art will appreciate that other organoantimony compounds as defined therein can be employed in the compositions and methods of the invention to protect a wide variety of materials and living organisms that are susceptible to attack by microorganisms. As many embodiments of this invention may be made without departing from the spirit and scope thereof, it is to be understood that the invention includes all such modifications as come within the scope of the appended claims.

I claim:

1. A method for protecting a medium susceptible to attack by microorganisms which comprises applying to the locus to be protected an effective amount of a compound $R_mSbX_{5-m}$ wherein R is selected from the group consisting of alkyl, alkenyl, monocarbocyclic aryl, alkynyl, cycloalkyl, and cycloalkenyl, X is selected from the group consisting of chloride, acrylate, pentachlorophenate, and quinolinolate, and $m$ is an integer less than 5.

2. A method for protecting a medium susceptible to attack by microorganisms as claimed in claim 1 wherein said compound is $R_3SbX_2$.

3. A method for protecting a medium susceptible to attack by microorganisms as claimed in claim 1 wherein R is phenyl.

4. A method for protecting a medium susceptible to attack by microorganisms as claimed in claim 1 wherein said compound is triphenyl antimony bis-pentachlorophenate.

5. A method for protecting a medium susceptible to attack by microorganisms as claimed in claim 1 wherein said compound is triphenyl antimony dichloride.

6. A method for protecting a medium susceptible to attack by microorganisms as claimed in claim 1 wherein said compound is triphenyl antimony bis-quinolinolate.

7. A method for protecting a medium susceptible to attack by microorganisms as claimed in claim 1 wherein said compound is triphenyl antimony diacrylate.

8. A composition active against microorganisms comprising a carrier and as the active component an antimony compound $R_mSbX_{5-m}$ wherein R is selected from the group consisting of alkyl, alkenyl, monocarbocylic aryl, cycloalkyl, alkynyl, and cycloalkenyl, X is selected from the group consisting of acrylate, pentachlorophenate, and quinolinolate, and $m$ is an integer less than 5.

9. A composition as claimed in claim 8 wherein $m$ is 3.

10. A composition as claimed in claim 8 wherein R is phenyl.

11. A composition as claimed in claim 8 wherein the compound is triphenyl antimony bis-pentachlorophenate.

12. A composition as claimed in claim 8 wherein the compound is triphenyl antimony bis-quinlinolate.

13. A composition as claimed in claim 8 wherein the compound is triphenyl antimony diacrylate.

14. The compound $R_mSbD_{5-m}$ wherein R is selected from the group consisting of alkyl, alkenyl monocarbocyclic aryl, alkynyl, cycloalkyl, and cycloalkenyl, and D is selected from the group consisting of acrylate and quinolinolate wherein $m$ is an integer less than 5.

15. Triphenyl antimony bis-acrylate.

16. Triphenyl antimony quinolinolate.

17. A microorganism resistant paint comprising a paint composition and an effective amount of compound $R_mSbX_{5-m}$ wherein R is selected from the group consisting of alkyl, alkenyl, monocarbocyclic aryl, alkynyl, cycloalkyl, and cycloalkenyl, X is seleced from the group consisting of chloride, acrylate, pentachlorophenate and quinolinolate, and $m$ is an integer less than 5.

18. A microorganism resistant plastic material comprising a plastic composition and 10–2000 p.p.m. of a compound $R_mSbX_{5-m}$ wherein R is selected from the group consisting of alkyl, alkenyl, monocarbocyclic aryl, alkynyl, cycloalkyl, and cycloalkenyl, X is selected from the group consisting of chloride, acrylate, pentachlorophenate and quinolinolate, and $m$ is an integer less than 5.

19. A microorganism resistant paper comprising a paper and an effective amount of a compound $R_mSbX_{5-m}$ wherein R is selected from the group consisting of alkyl, alkenyl, monocarbocyclic aryl, alkynyl, cycloalkyl, and cycloalkenyl, X is selected from the group consisting of chloride, acrylate, pentachlorophenate and quinolinolate, and m an integer less than 5.

20. A microorganism resistant textile material comprising a textile composition and an effective amount of a compound $R_mSbX_{5-m}$ where R is selected from the group consisting of alkyl, alkenyl, monocarbocyclic aryl, alkynyl, cycloalkyl, and cycloalkenyl, X is selected from the group consisting of chloride, acrylate, pentachlorophenate and quinolinolate, and m is an integer less than 5.

21. A spray composition active against microorganisms comprising a liquid carrier, a propellant, and as the active component an effective amount of a compound $R_mSbX_{5-m}$ wherein R is selected from the group consisting of alkyl, alkenyl, monocarbocyclic aryl, alkynyl, cycloalkyl, and cycloalkenyl, X is selected from the group consisting of chloride, acrylate, pentachlorophenate and quinolinolate, and m is an integer less than 5, said compound being present in the amount of 0.01–1% by weight of the total composition.

22. A composition active against microorganisms comprising a solid carrier and as the active component an antimony compound $R_mSbX_{5-m}$ wherein R is selected from the group consisting of alkyl, alkenyl, monocarbocyclic aryl, cycloalkyl, alkynyl, and cycloalkenyl, X is chloride, and m is an integer less than 5, said compound being present in the amount of 5%–50% by weight of the total composition.

23. A composition as claimed in claim 22 wherein m is 3.

24. A composition as claimed in claim 22 wherein R is phenyl.

25. A composition as claimed in claim 22 wherein the compound is triphenyl antimony dichloride.

References Cited by the Examiner

UNITED STATES PATENTS

| 2,802,771 | 8/1957 | Fields et al. | 167—33 |
| 2,809,146 | 10/1957 | Osborn et al. | 167—33 |
| 2,839,554 | 6/1958 | Haslam | 260—446 |
| 2,876,227 | 3/1959 | Schaeffer | 260—270 |
| 2,938,828 | 5/1960 | Waarden et al. | 167—30 |
| 2,993,924 | 7/1961 | Marks et al. | 260—466 |
| 3,031,425 | 4/1962 | Schoepfle et al. | 260—446 |
| 3,033,865 | 5/1962 | Fronmuller et al. | 260—270 |
| 3,058,877 | 10/1962 | Musser | 167—38.5 X |
| 3,130,123 | 4/1964 | Weiss et al. | 167—33 |

FOREIGN PATENTS

| 569,037 | 5/1945 | Great Britain. |

OTHER REFERENCES

Coates: "Organo-Metallic Compounds," John Wiley & Sons, Inc., New York, 1956, pp. 214–227.

Harwood: The Industrial Chemist, July 1959, pp. 348–350.

Kuhl: 56 page dissertation, "Concerning Aliphatic Substituted Antimony-Acetylenic Compounds," Technischen Hochschule Braunchweig, Braunschweig, Germany, 1957, pp. 13, 21, 47 and 52.

JULIAN S. LEVITT, *Primary Examiner.*

MORRIS O. WOLK, *Examiner.*

D. MOYER, G. A. MENTIS, *Assistant Examiners.*